United States Patent
Grinberg et al.

(10) Patent No.: US 9,083,946 B2
(45) Date of Patent: Jul. 14, 2015

(54) SYSTEM TO DETECT FAILED PIXELS IN A SENSOR ARRAY

(75) Inventors: Anatoly G. Grinberg, Brighton, MA (US); Wayne R. Foster, Tyngsborough, MA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 658 days.

(21) Appl. No.: 13/401,329

(22) Filed: Feb. 21, 2012

(65) Prior Publication Data

US 2013/0215418 A1    Aug. 22, 2013

(51) Int. Cl.
*G01J 1/44* (2006.01)
*H04N 17/00* (2006.01)
*H04N 5/367* (2011.01)

(52) U.S. Cl.
CPC .............. *H04N 17/002* (2013.01); *H04N 5/367* (2013.01)

(58) Field of Classification Search
CPC .... G01N 21/9505; H04N 7/002; H04N 5/367
USPC ................ 250/215, 208.1, 239, 353, 339.11, 250/252.1
See application file for complete search history.

(56) References Cited

U.S. PATENT DOCUMENTS

| | | | | |
|---|---|---|---|---|
| 6,127,679 | A  * | 10/2000 | Ashley et al. | 250/252.1 |
| 6,285,021 | B1 * | 9/2001 | Fayfield | 250/221 |
| 6,359,681 | B1 * | 3/2002 | Housand et al. | 356/4.01 |
| 6,655,778 | B2 * | 12/2003 | Arquilevich et al. | 347/19 |
| 6,888,572 | B1 | 5/2005 | Kozlowski | |
| 7,081,614 | B2 | 7/2006 | Duncan et al. | |

* cited by examiner

*Primary Examiner* — Seung C Sohn
(74) *Attorney, Agent, or Firm* — Boyle Fredrickson, S.C.

(57) ABSTRACT

A system to test operation of an optical sensor is disclosed. The optical sensor includes one or more photosensitive devices configured to convert light to electrical signals. A test light source is included within the housing of the optical sensor. The test light source is periodically pulsed on to emit radiation at a sufficient intensity to saturate each of the photosensitive devices. Each of the photosensitive devices generates a signal corresponding to the intensity of light detected at that device. A logic circuit uses the signals corresponding to the intensity of light to identify whether each of the photosensitive devices is performing at an acceptable level.

11 Claims, 2 Drawing Sheets

SYSTEM TO DETECT FAILED PIXELS IN A SENSOR ARRAY

BACKGROUND OF THE INVENTION

The subject matter disclosed herein relates to an optical sensor used in a safety system and, more specifically, to a system to test performance of the optical receiver used in the optical sensor.

An optical sensor includes a receiver that converts light incident to the sensor into an electric signal. The receiver may include a single photosensitive device or an array of pixels, for example charge-coupled devices (CCD) or complementary metal-oxide-semiconductor (CMOS) sensors. Each pixel converts the light incident to that pixel to a separate electrical signal. The optical sensor typically has an opening through which the light passes and may further include a lens or optical filter over the opening to focus the light on the detector. Depending on the application requirements and the configuration of the sensor, the optical sensor is suited for a variety of uses ranging from indicating the presence of a beam of light to reproducing a three dimensional (3D) image of an object.

It is known that the sensitivity of the receiver changes over time and may eventually fail. In an array of pixels, individual pixels may fail or underperform. Although the receiver may be able to continue operation with a small number of failed pixels, if the number of failed pixels becomes too great, the performance of the receiver will become unacceptable. By periodically evaluating the performance of the receiver, degradation or failure of the photosensitive device or of individual pixels may be detected. The performance of the receiver may be tested by directing a reference light source toward the sensor with sufficient intensity to saturate the receiver. Comparing the resulting electrical signals to an expected value can be used to detect changes in the performance of the receiver.

However, optical sensors are often used in applications that are not conducive to supplying a reference light for testing of the sensor. For example, the sensor may be a component of a safety system, such as a light curtain or a 3D camera monitoring access to or operation of an industrial machine or process line. The machine or process line may operate on a near-continuous basis with periodic maintenance scheduled on a monthly or even less frequent interval. Because the safety system is typically protecting an operator from a potentially hazardous operating region or condition, industrial standards require more frequent monitoring of the operating performance than achieved by periodic maintenance alone.

Thus, it would be desirable to provide a system that regularly tests operation of the sensor without interrupting normal operation of the sensor.

BRIEF DESCRIPTION OF THE INVENTION

The subject matter disclosed herein describes a system to test operation of an optical sensor. The optical sensor includes one or more photosensitive devices configured to convert light to electrical signals. A test light source is included within the housing of the optical sensor. The test light source is periodically pulsed on to emit radiation at a sufficient intensity to saturate each of the photosensitive devices. Each of the photosensitive devices generates a signal corresponding to the intensity of light detected at that device. A logic circuit uses the signals corresponding to the intensity of light to identify whether each of the photosensitive devices is performing at an acceptable level.

According to a first embodiment of the invention, an optical sensor for use in a safety system includes a housing and an optical receiver mounted within the housing. An optical source is also mounted within the housing and configured to emit radiation at an intensity sufficient to saturate the optical receiver. A logic circuit is configured to receive at least one signal from the optical receiver corresponding to the intensity of the radiation received by the optical receiver and to compare the intensity of the radiation received by the optical receiver to a predetermined threshold. The logic circuit generates a signal responsive to the intensity of the radiation received by the optical receiver.

According to another embodiment of the invention, a method of verifying operation of an optical sensor used in a safety system is disclosed. The optical sensor has an optical receiver mounted within a housing. An optical source is mounted within the housing and emits radiation at an intensity sufficient to saturate the optical receiver. The radiation is emitted from the optical source at a first periodic interval, and the optical receiver generates a signal corresponding to the intensity of the radiation detected. The intensity of the radiation detected is compared to a predetermined threshold, and an indicator signal is generated responsive to comparing the intensity of the radiation to the predetermined threshold.

According to still another embodiment of the invention, an optical sensor system for use in a safety system includes a first optical source and an optical sensor unit. The first optical source is configured to transmit light in a defined path. The optical sensor unit further includes a housing, an optical receiver, a second optical source. The housing has an opening positioned to receive light either directly from the first optical source or reflected from an object passing through the defined path. The optical receiver is mounted within the housing to receive the light entering through the opening, and the second optical source is mounted within the housing and configured to transmit sufficient light to saturate the optical receiver. A controller is in, communication with each of the first optical source, the second optical source, and the optical receiver. The controller is configured to periodically transmit light from either the first optical source or the second optical source, detect the presence of the light from either the first optical source or the second optical source at the optical receiver, determine whether an object exists in the defined path if the first optical source is transmitting, and evaluate operation of the optical receiver if the second optical source is transmitting.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications, may be made within the scope of the present invention without departing, from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
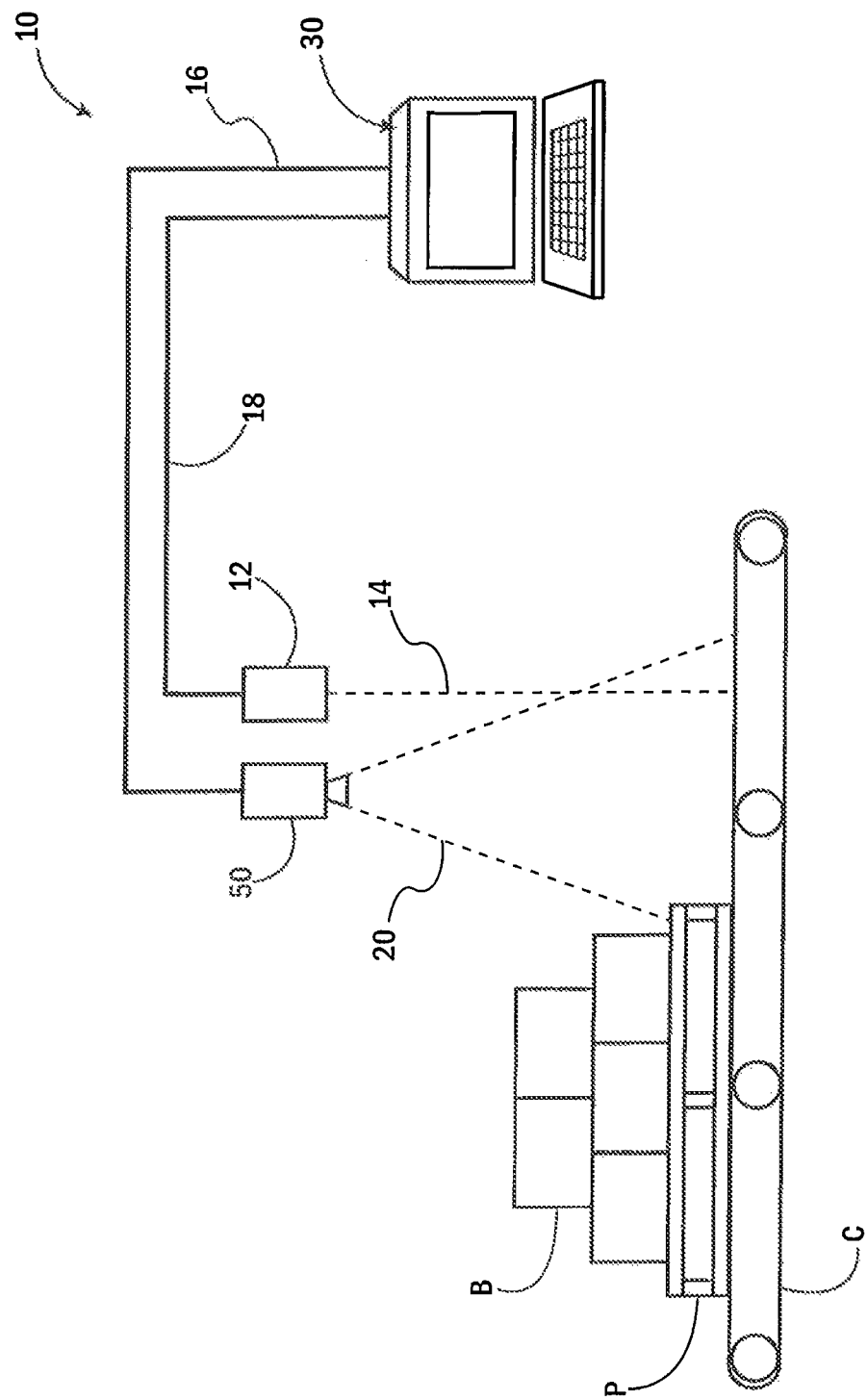
FIG. 1 is a an exemplary environmental view incorporating one embodiment of the present invention.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION OF THE PREFERRED EMBODIMENTS

Turning initially to FIG. 1, an optical, sensor system 10 is illustrated operating in an exemplary environment. The optical sensor system 10 includes a first optical source 12 configured to transmit light in a defined path 14. The first optical source 12 may be any suitable source emitting radiation, for example, in the visible or infrared spectrums. The first optical source 12 may be, but is not limited to, a light emitting diode, an infrared diode, or a laser diode. Further, the first optical source 12 may include one or more light sources and, optionally, may include a lens, a filter, or other optical device to direct, focus, or filter, the light being emitted from the source 12. The defined path 14 is, for example, a beam or a plane of light, which is intended to be transmitted to an optical sensor 50 either directly or by reflection, for example, from an object intersecting the defined path 14.

As shown in FIG. 1, the first optical source 12 may emit a plane of light along a defined path 14. Optionally, multiple beams of light may be directed along the path 14. The path 14 intersects a conveyor, C, and is used to detect the presence, or absence, of an object along the conveyor, C. The conveyor, C, may carry a pallet, P, of boxes, B, between two points. The light emitted from the first optical source 12 reflects off the boxes, B, and is detected by the optical sensor 50. The optical sensor 50 converts the light received at the sensor to an electrical signal 16 which is transmitted to a controller 30. The optical sensor 50 is capable of detecting light reflected off objects within its field of view 20. The electrical signal 16 generated by the sensor may be a binary on/off signal indicating the presence or absence of an object within the field of view 20 or, optionally, the electrical signal 16 may be an analog value corresponding to the intensity of light received by the optical sensor 50. The controller 30 uses the electrical signal 16 according to the application requirements, for example, to stop the conveyor, C, if an unexpected object is detected within the predefined path 14 or to reconstruct an image of the boxes, B, and pallet, P, passing through the predefined path 14. According to still another embodiment of the invention, at least a portion of the controller 30 may be incorporated into the optical sensor 50 to directly process the electrical signal 16. In addition, the controller 30 may provide a control signal 18 to the first optical source 12 to control the light emitted.

According to still other embodiments of the invention, the first optical source 12 and the optical sensor 50 may be configured to transmit and receive an optical beam in a defined path 14 configured to cross the path of the conveyor, C, either horizontally or at an angle and displaced above the conveyor, C. The optical sensor 50 may be configured to normally set the electrical signal 16 indicating it is receiving a beam of light from the optical source 12. The electrical signal 16 is reset if an object intersects the defined path 14. The first optical source 12 may be a single beam or multiple beams of light, defining, for example, a light curtain. Similarly, the light curtain may be arranged horizontally and parallel with the conveyor to detect, for example, an operator reaching across the conveyor or into a protected region. The electrical signal 16 may be used by the controller 30 to disable the conveyor, C, or other mechanical device operating within the protected region upon detection of an object entering the protected region.

Figure 2:
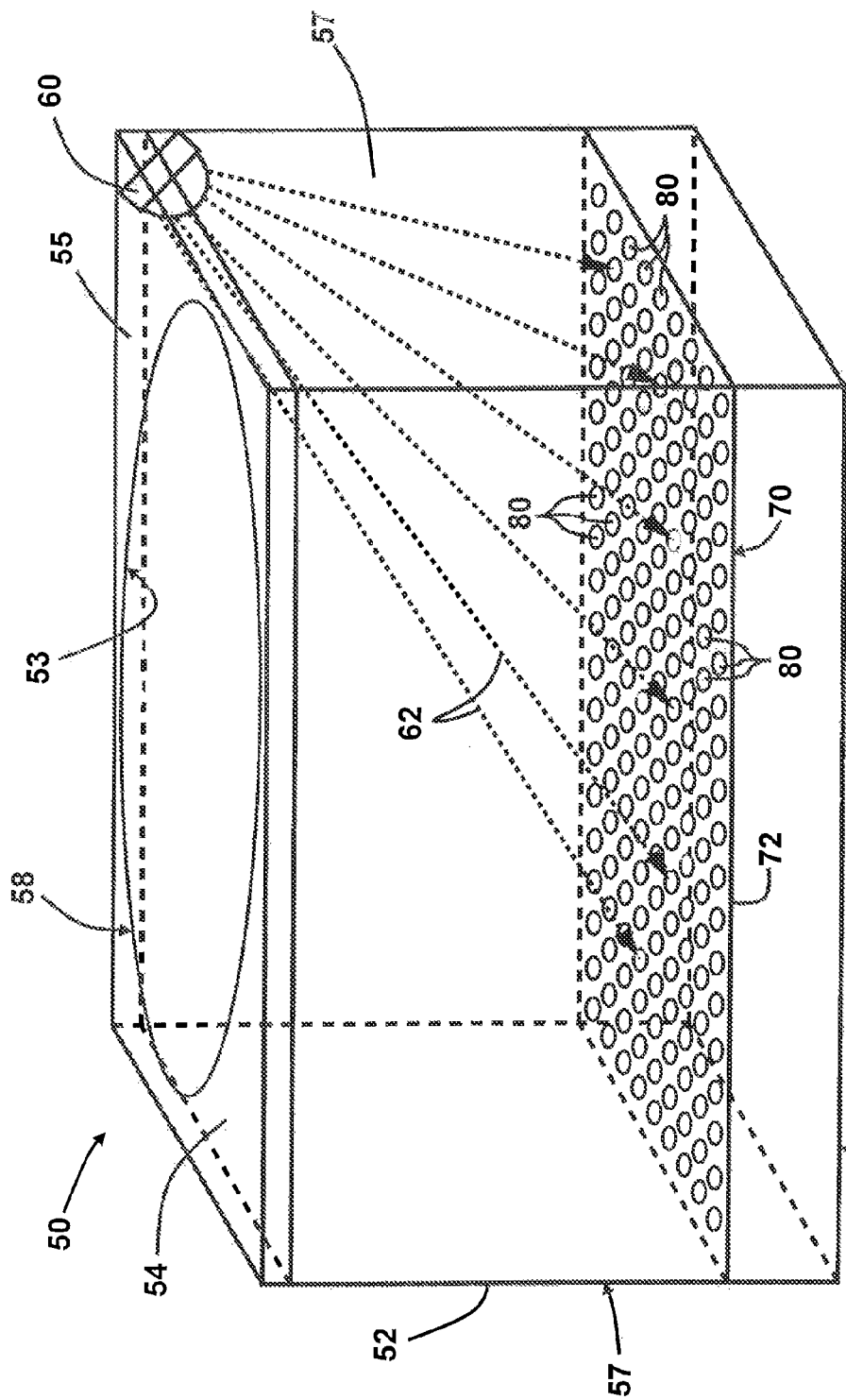
FIG. 2 is a block diagram representation of one embodiment of the present invention.

Referring next to FIG. 2, the optical sensor 50 includes a housing 52 having a front wall 54 and a rear wall 56. The front wall 54 has an interior surface 53, an exterior surface 55, and an opening 58 that extends through the front wall 54 and is configured to allow incident light to pass into the optical sensor 50. A second optical source 60 is mounted on the interior surface 53 of the front wall 54. Optionally, the second optical source 60 may be mounted on a side wall 57 or external to the optical sensor 50. The second optical source 60 may be, but is not limited to, a light emitting diode, an infrared diode, or a laser diode. An optical receiver 70 is mounted within the housing and configured to receive light incident to the sensor 50. The optical receiver 70 may be mounted, for example, to a substrate 72 proximate to the rear wall 56. The illustrated embodiment is intended to be exemplary and it is farther contemplated that the optical sensor 50 may be of numerous shapes and configurations having for example no front wall or the optical receiver 70 positioned proximate to the front wall 54 of the sensor 50.

The optical receiver 70 includes at least one photosensitive device 80. The photosensitive device 80 may be for example, an active pixel sensor (APS), such as a complementary metal-oxide semiconductor (CMOS) sensor, or a passive pixel sensor (PPS) such as a charge coupled device (CCD). The optical receiver 70 may include a single photosensitive device 80 to generate, for example, a binary signal, or an array of photosensitive pixels 80 to reproduce, for example, an image of an object. The optical receiver 70 may require control signals to select a row or column of signals 16 to be read from the array of pixels 80. It is further contemplated that a portion or all of the control functions from the controller 30 may be integrated with the receiver 70 onto an application specific integrated circuit (ASIC).

In operation, the second optical source 60 is used to test operation of the optical receiver 70. The controller 30 generates a control signal to enable the second optical source 60. The second optical source 60 is selected to emit radiation 62 at a sufficient intensity to saturate the photosensitive devices 80. In addition, the second optical source 60 is mounted such that the radiation 62 emitted by the source 60 saturates the entire optical receiver 70 whether the receiver 70 includes a single photosensitive device 80 or an array of photosensitive pixels 80. Because each photosensitive device 80 typically outputs a voltage as a function of the intensity of light received, by the device 80 the resulting output voltage generated by each device 80 should be a known maximum value if the second optical source 60 is emitting radiation 62 sufficient to saturate the devices 80. If one of the photosensitive devices 80 is generating an output voltage less than the known maximum value or less than a predetermined percentage of the known maximum value, the controller 30 identifies that photosensitive device 80 as underperforming. If one of the photosensitive devices 80 is generating no output voltage, the controller 30 identifies that photosensitive device 80 as failed. Optionally, the photosensitive device 80 may generate a binary on/off signal responsive to the intensity of incident light received by the device 80 being greater than or less than a threshold level. If the photosensitive device 80 generates a binary on/off signal and remains off during the test, the controller 30 identifies that photosensitive device 80 as failed.

An indicator signal is generated responsive to the test to indicate the status of the optical receiver 70 to an operator. If the receiver includes a single photosensitive device 80, determination that the device 80 is either underperforming or failed may be a critical fault condition and the indicator signal may be used to halt operation of equipment within a monitored region or to provide an operator with a visual or audio indication of the fault condition. If the optical receiver 70 includes an array of photosensitive devices 80, a threshold or maximum number of photosensitive devices 80 that may be identified as underperforming or failed may be selected. If the number of photosensitive devices 80 identified as underperforming or failed is within the acceptable range, the indicator signal may be set to indicate that the optical receiver 70 is operating normally. If the number of photosensitive devices 80 identified as underperforming or failed is outside the acceptable range, the indicator signal may be reset to indicate that the optical receiver 70 is no longer operating normally.

In a safety system, the sensor system 10 may be used, for example, to detect unauthorized entry of a person or object into a restricted area or to detect the presence of a work-piece or part being transferred into a work zone. According to one embodiment of the invention, the optical source 12 may be one or more light beams establishing a light curtain, and each of the beams is received by one or more optical sensor units 50. According to another embodiment of the invention, the optical source 12 may generate a plane of light and the optical sensor unit 50 may be a 3-D camera that generates images of the objects from which the light is reflected. The type of optical source 12 and sensor unit 50 is selected according to the application requirements.

Regardless of the type of optical source 12 and sensor unit 50 selected, testing of the optical sensor system 10 is coordinated with the normal monitoring function of the system 10. A command signal 18 from the controller 30 controls operation of the first optical source 12 which may be continuously enabled any time a particular zone is to be monitored. Optionally, the first optical source 12 may be toggled on and off in coordination with the second optical source 60 mounted within the housing 52 of the optical sensor 50. Another command signal from the controller 30 similarly controls operation of the second optical source 60. The second optical source 60 is enabled during testing of the optical sensor 50. Because the second optical source 60 is configured to saturate the optical receiver 70, the first optical source 12 does not need to be disabled during the test.

In order to maintain continuous monitoring of a protected region, the test may be interleaved with the monitoring function. The safety requirements of an application typically provide a rate, or cycle time, at which the optical sensor 50 must be sampled to determine the intensity of light received from the first optical source 12 and, thereby, detecting the presence or absence of an object within the protected region. Within this cycle time, the optical sensor 50 must sample the light from the first optical source 12 and conduct any necessary diagnostics or performance checks according to the application requirements. Therefore, during this cycle, the controller 30 provides the control signal 18 to energize the first optical source 12, allows sufficient time for the optical sensor 50 to receive the radiated light, and reads the corresponding signal 16 from the optical sensor 50. The controller 30 may then de-energize the first optical source 12, if needed, and energize the second optical source 60. After sufficient time has passed for the photosensitive devices 80 to saturate, the controller 30 reads each of the signals from the photosensitive devices 80.

After reading the signals from each of the photosensitive devices 80, the controller de-energizes the second optical source 60. The controller 30 may then determine whether any of the photosensitive devices 80 are under performing or have failed. Thus, the normal monitoring function and each of the test functions are each performed within the cycle time of the optical sensor 50.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention

We claim:

1. An optical sensor for use in a safety system, comprising a housing;
an optical receiver mounted within the housing;
an optical source mounted within the housing and configured to emit radiation at an intensity sufficient to saturate the optical receiver wherein the emitted radiation remains within the housing between the optical source and the optical receiver; and
a logic circuit configured to:
receive at least one signal from the optical receiver corresponding to the intensity of the radiation received by the optical receiver,
compare the intensity of the radiation received by the optical receiver to a predetermined threshold, and
generate a signal responsive to the intensity of the radiation received by the optical receiver.

2. The optical sensor of claim 1 wherein the optical receiver includes a photosensitive device generating a signal responsive to the intensity of the incident light.

3. The optical sensor of claim 1 wherein the optical receiver includes an array of photosensitive elements, each photosensitive element generating a signal corresponding to the intensity of light incident on the photosensitive element.

4. The optical sensor of claim 3 wherein the logic circuit receives the signals from each of the photosensitive elements and generates an indicator signal for each of the photosensitive elements which are non-responsive or underperforming.

5. The optical sensor of claim 1 wherein the optical source is selected from one of a light emitting diode, an infrared diode, and a laser diode.

6. The optical sensor of claim 1 wherein the logic circuit is further configured to control the optical source to emit the radiation and to subsequently compare the intensity of the radiation received by the optical receiver to the predetermined threshold at a first periodic interval.

7. The optical sensor of claim 6 wherein the logic circuit is further configured to read the signals from the optical receiver corresponding to the intensity of radiation received from incident light at a second periodic interval interspersed with the first periodic interval.

8. An optical sensor for use in a safety system, comprising a housing which includes:
a front wall having an interior and an exterior surface,
a rear wall generally opposite the front wall, and
an opening extending through the front wall;

an optical receiver mounted within the housing on a substrate located proximate to the rear wall and opposite the opening in the front wall;

an optical source mounted within the housing proximate to the front wall and configured to emit radiation at an intensity sufficient, to saturate the optical receiver; and a logic circuit configured to:
- receive at least one signal from the optical receiver corresponding to the intensity of the radiation received by the optical receiver,
- compare the intensity of the radiation received by the optical receiver to a predetermined threshold, and
- generate a signal responsive to the intensity of the radiation received by the optical receiver.

9. A method of verifying operation of an optical sensor used in a safety system, the optical sensor having an optical receiver mounted within a housing, comprising the steps of:

mounting an optical source within the housing, wherein the optical source emits radiation;

emitting the radiation from the optical source at an intensity sufficient to saturate the optical receiver at a first periodic interval;

generating a signal from the optical receiver corresponding to the intensity of the radiation detected;

comparing the signal corresponding to the intensity of the radiation detected to a predetermined threshold; and generating an indicator signal responsive to comparing the signal corresponding to the intensity of the radiation to the predetermined threshold.

10. The method of claim 9 wherein the optical receiver includes an array of photosensitive elements and the following steps are performed for each of the photosensitive elements: generating the signal from the optical receiver corresponding to the intensity of the radiation detected, comparing the signal corresponding to the intensity of the radiation detected to the predetermined threshold, and generating the indicator signal responsive to comparing the signal corresponding to the intensity of the radiation to the predetermined threshold.

11. The method of claim 9 further comprising the step of generating a signal from the optical receiver corresponding to the intensity of the incident light detected at a second periodic interval interspersed with the first periodic interval.

* * * * *